United States Patent [19]

Bonal

[11] Patent Number: 4,641,234
[45] Date of Patent: Feb. 3, 1987

[54] A-C OR D-C TO D-C CONVERTER FOR DUAL CURRENT LOCOMOTIVES WITH D-C MOTORS

[75] Inventor: Jean Bonal, Melun, France

[73] Assignee: Jeumont-Schneider Corporation, Puteaux, France

[21] Appl. No.: 679,753

[22] Filed: Dec. 10, 1984

[30] Foreign Application Priority Data

Dec. 13, 1983 [FR] France ................... 83 19899

[51] Int. Cl.⁴ ............................................. H02M 9/00
[52] U.S. Cl. ...................................... 363/124; 363/88; 363/142; 318/441; 307/72
[58] Field of Search ................. 307/72, 56, 73; 318/441; 363/142, 125, 88, 128, 124; 191/3

[56] References Cited

U.S. PATENT DOCUMENTS

| | | | |
|---|---|---|---|
| 3,434,034 | 3/1969 | Garber et al. | 320/25 |
| 3,940,680 | 2/1976 | Tadokoro et al. | 363/142 |
| 4,088,937 | 5/1978 | Uchida et al. | 363/142 |

FOREIGN PATENT DOCUMENTS

| | | |
|---|---|---|
| 1264595 | 3/1968 | Fed. Rep. of Germany . |
| 2256557 | 7/1975 | France . |
| 2322476 | 3/1977 | France . |

*Primary Examiner*—Patrick R. Salce
*Assistant Examiner*—Jeffrey Sterrett
*Attorney, Agent, or Firm*—Rines and Rines, Shapiro and Shapiro

[57] ABSTRACT

The present invention relates to supplying a load either from a direct-current source or from an alternating-current source. The power unit, according to the invention, is characterized in that it consists of a single conversion unit (CV) having unidirectional semi-conductor power components forming switches (I1, I2, I3, I4) controlled in appropriate fashion by a logic control in such a manner as to ensure the functioning of the conversion unit (CV) either in a chopper mode, or in a rectifier mode when the load functions to draw power, or to ensure energy regeneration when the load functions in a generating mode. The present invention has application particularly for supplying direct-current motors used in dual-current railroad locomotives.

8 Claims, 3 Drawing Figures

A-C OR D-C TO D-C CONVERTER FOR DUAL CURRENT LOCOMOTIVES WITH D-C MOTORS

BACKGROUND OF THE INVENTION

This invention relates to a power-supply unit particularly for direct-current motors of dual-current railroad locomotives using semiconductor equipment for speed control.

It is known that there are power-supply units using a 1,500 or 3,000-volt D-C source or a single-phase A-C source, particularly 25 or 50 kilovolts at 50 Hz or 60 Hz, for modern locomotives. The semiconductor equipment of such units, of the static type, comprises single-way bridge rectifiers divided into two fundamental categories for single-phase operation: fully controlled bridges or full thyristor bridges and semi-controlled bridges or mixed bridges; and drive choppers for a D-C operation.

It is also known that there is a power unit for supplying D-C current and A-C current to at least one traction motor, the electric circuit of which permits the re-use, in single phase, of the main semiconductor components, such as thyristors, of the chopper in order to provide a mixed bridge.

However, the electric circuit of such a unit has the disadvantage of using a great number of contactor components to modify the configuration of the unit from the chopper mode to the rectifier mode or vice-versa. Furthermore, this known unit does not permit regenerative braking in either A-C or D-C and it also has a poor power factor.

SUMMARY OF THE INVENTION

The object of the present invention is to eliminate the above-described disadvantages by providing a power unit for supplying a load such as a D-C motor, a self-controlled synchronous motor, an induction motor, etc., either from a D-C source or from an A-C source, with the power unit of the invention consisting of a single conversion unit comprising four unidirectional semiconductor power components forming switches which are controlled in an appropriate fashion by a logic control in such a manner as to ensure the operation of the conversion unit either in a chopper mode when the unit has a D-C supply or in a rectifier mode when the unit has an A-C supply, when the load is utilizing power, and in a inverting mode to ensure energy regeneration when the load is generating power.

In a single-current arrangement, at least two of these semiconductor components consist of components which may have their change of state controlled directly, the two other components functioning as diodes, whereas in a dual-current arrangement it is mandatory that at least three of the four components consist of components which may have their change of state controlled directly.

These semiconductors components which may have their change of state controlled directly are, for example, thyristors having gate-controlled turn-off called "GTO" or else isolated gate transistors called "IGT". The invention is not limited to these types of semiconductors but, on the contrary, is applicable to any type of unidirectional semiconductor forming a power switch whose passage from the saturated state to the blocked state; e.g., the turn-off for a thyristor, is controlled directly by applying a signal on a gate without requiring a supplementary complex circuit permitting, for example, the elimination of the current flowing in this component so as to modify its state.

Thus, the configuration of the conversion unit, according to the present invention, remains unchanged whether it is supplied in direct current or in single-phase current.

In summary, the invention embodies a power unit of an electric traction motor for dual-current railroad locomotives, from either a D-C source or an A-C source, comprising in combination:

a transformer whose primary winding is connected to the source when the latter is of the A-C type, an inductance and a capacitor being arranged in series between the secondary terminals of this transformer by means of an inverter installed in such a manner as to connect the inductance and the capacitor, either at the transformer secondary when the source is of the A-C type, or directly to the source when the latter is of the D-C type while at the same time disconnecting the secondary of the circuit in this latter case, and between the terminals of the capacitor, a bridge consisting of four unidirectional semiconductor components forming switches, at least three of which consist of components whose change of state may be controlled directly whereas the fourth may have a controlled turn-on and a natural turn-off, the motor (M) being connected to the output of this bridge possibly in series with a reshaping inductance.

BRIEF DESCRIPTION OF THE DRAWINGS

The invention will be best understood and other purposes, characteristics, details and advantages will appear more clearly during the following explanatory description prepared in reference to the attached diagrammatic drawings which are included solely to illustrate a method of applying the invention and in which.

DESCRIPTION OF THE PREFERRED EMBODIMENTS

Figure 1:
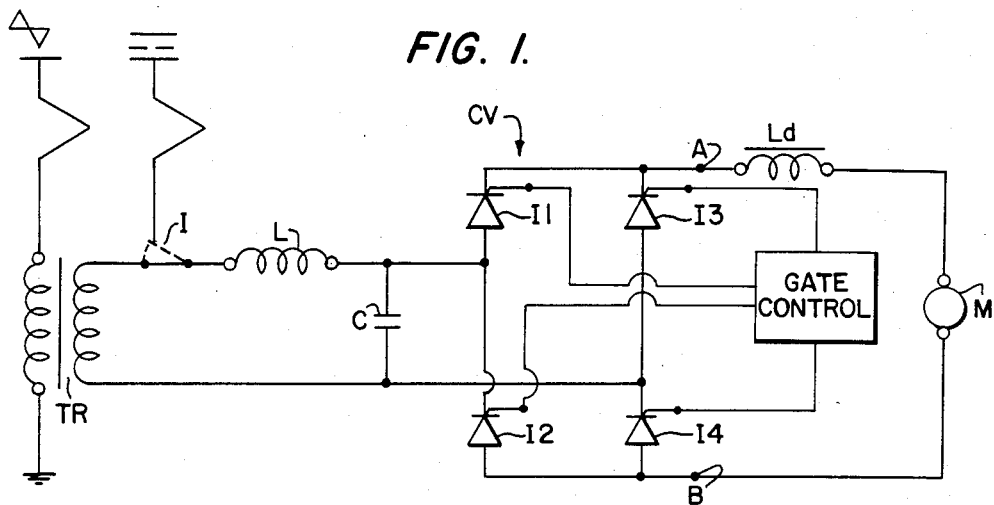
FIG. 1 represents the general electrical diagram of a power unit according to the invention.

FIG. 1 shows the diagram of the power unit for supply by catenary, either in direct current or in single-phase current, of a D-C traction motor M installed on series with its reshaping inductance Ld, the motor being either of the series or parallel-excitation type. The power unit comprises a power transformer TR supplied in single-phase current, for example 25 kV or 50 kV at 50 Hz or 60 Hz, the secondary of which is connected by means of a controlled inverter (switch) I to an input filter LC, the dotted-line position of the switch I representing the D-C supply of the motor M, for example, 1,500 or 3,000 volts (the power transformer TR is then isolated from the head filter LC).

A conversion unit CV having unidirectional semiconductor power components forming switches I1, I2, I3, I4 is connected between the filter LC and output terminals A and B to which is connected the load formed by the inductance Ld and the motor M.

It is easy to recognize that the general configuration of the conversion unit CV is that of a four-branch rectifier bridge each branch of which comprises at least one semiconductor component. Thus, in the case where all of the semiconductor components I1 to I4 are power thyristors, semiconductor components I1 and I2 form the two upper branches of the bridge with the anode of I1 and the cathode of I2 connected to the common junction of L and C of the filter and the cathode of the I1 and the anode of I2 connected, respectively, to the terminals A and B. The semiconductor components I3 and I4 constitute the lower branches of the bridge with the cathode of I3 and the anode of I4 connected, respectively, to the terminals A and B, and the anode of I3 and the cathode of I4 connected to the common junction of the capacitor C and a secondary terminal of the transformer TR.

Figure 2:
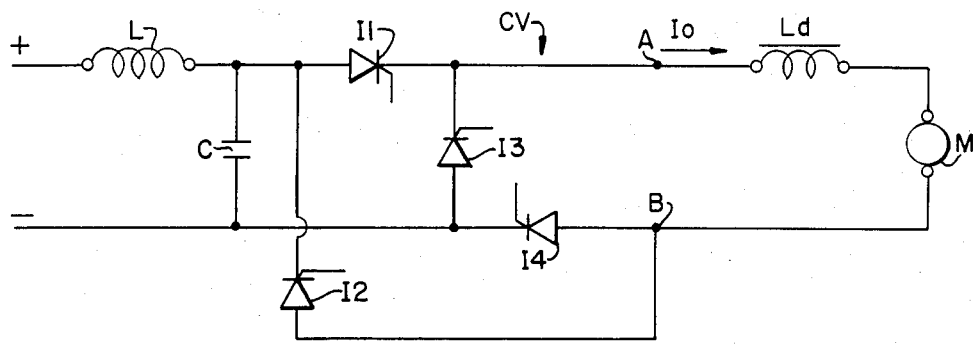
FIG. 2 illustrates the operation of the power unit according to the invention when it is supplied from a D-C source.
Figure 3:
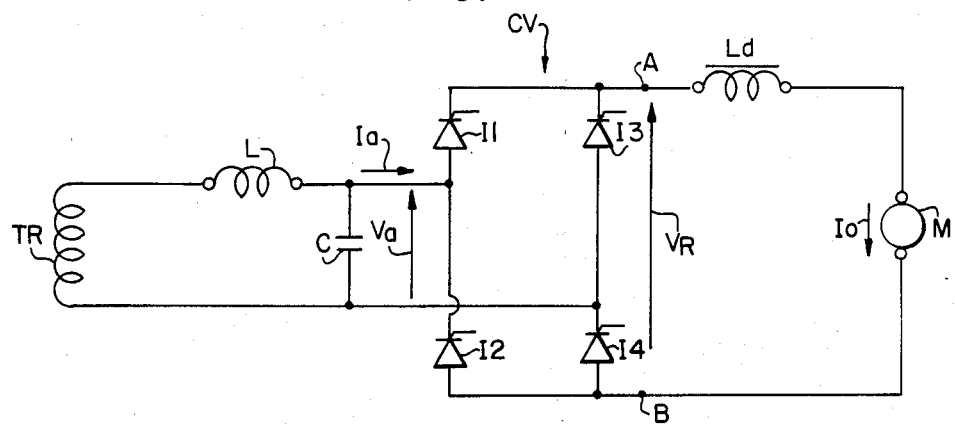
FIG. 3 illustrates the operation of the power unit according to the invention when it is supplied from an A-C source.

As shown in FIG. 1, the respective gates of switches I1–I4 are respectively connected to gate control logic (which, for simplicity, has not been depicted in FIGS. 2 and 3). The gate control logic may comprise any control circuitry suitable for providing control signals to the gates in order to effect operation of the power unit in accordance with the ensuing description.

FIG. 2 illustrates the operation of the power unit when it is supplied with direct current.

When the motor M functions in driving (draws power), the conversion unit CV is operated as a chopper whose switch I1 constitutes the main semiconductor permitting modulation of the power supplied by the D-C source. Thus, the passing or blocked state of the semiconductor component I1 is controlled in an appropriate manner for operation in the chopper made by the control logic, with the semiconductor components I3 and I4 remaining in the passing state whereas the semiconductor component I2 is permanently blocked. The semiconductor components I3 and I4, therefore, behave like diodes and the semiconductor components I3 and I4 serve as freewheeling or discharge diodes.

Thus, when the semiconductor component I1 is conducting, the current I0 of the motor is supplied by the source through the semiconductor component I1 and when the latter is blocked the motor current is closed through the semiconductor components I3 and I4 forming freewheeling diodes until I1 is restarted. It should be noted that the change of state of the semiconductor component I1, as will be apparent from the function of this component as described above, must be controlled. According to the invention, this component is a gate-turn-off thyristor.

When the load functions in a generating mode, it is possible to effect regeneration by controlling the semiconductor components in such a manner that the semiconductor component I1 is permanently blocked, the semiconductor components I2 and I3 are in permanent passing state, and the semiconductor component I4 is alternatively passing or blocked (I4 must then be a gate-turn-off thyristor). It will be appreciated, of course, that the polarities at terminals A and B are reversed when the motor becomes a generator. FIG. 3 illustrates the operation of the power unit when it is supplied from an A-C source at the secondary of the power transformer TR, the components I3 and I4 then being the equivalent of diodes.

The alternative source supplies a current I0 to the load when one of thyristors I1 or I2 of the circuit of FIG. 3 is conducting; outside of these instants, the components I3 and I4 ensure passage of the current. When the load functions as a generator, i.e., when energy is being regenerated, the current flows into the conversion unit in the same direction as when the load functions as a motor; but, on the other hand, the voltage at the motor terminals is reversed. The conversion unit then functions as an inverter in classic fashion.

Of course, in order to utilize the conversion unit CV in the present case, it is preferable to control it in such a manner that the alternative source delivers an A-C current whose fundamental is in phase with the voltage fundamental.

It is well understood that the conversion unit CV may be controlled by logic control as a classic full-thyristor rectifier bridge.

It should be noted that the conversion unit CV may function as a mixed bridge, as a drive or as a full-thyristor bridge for regenerative braking.

Moreover, it should be pointed out that if it is desired to have the power-supply unit function in all of the abovementioned modes, at least three of the switches of the conversion unit CV are components whose change of state may be controlled directly, and the fourth may be of the type having controlled turn-on and natural turn-off.

It should be understood that the power unit, according to the invention, not only permits supplying D-C motors, but also self-controlled synchronous motors, induction motors having forced-commutation current and induction motors whose commutation is performed directly by the conversion unit CV.

A description has thus been provided, according to the invention, of a power unit permitting supplying a load in either A-C or in D-C and this without any modification whatsoever of its electrical diagram.

In addition, such a power unit has an excellent power factor. It has application in railroad applications for the electrical equipment of dual-current locomotives.

I claim:

1. A power unit for supplying a D-C load from either an A-C or a D-C source, comprising a bridge circuit having two input terminals and two output terminals and four branches each including a unidirectional semiconductor device, the respective semiconductor devices of said branches being connected in such a manner as to permit current flow in only one direction through said output terminals, at least two of said semiconductor devices being of the gate-controlled turn-off type; switching means connected to said input terminals for switching said terminals selectively between an A-C supply and a D-C supply; and gate control means for providing control signals to the gates of said gate-controlled turn-off devices to operate said bridge circuit in a chopper mode when said input terminals are supplied with D-C and in a rectifier mode when said input terminals are supplied with A-C.

2. A power unit according to claim 1, further comprising an input filter including an inductance and a capacitor, said capacitor being connected between said input terminals of said bridge circuit, said inductance being connected between said capacitor and said switching means.

3. A power unit according to claim 1, wherein at least one of said gate-controlled turn-off devices is a gate-controlled turn-off thyristor.

4. A power unit according to claim 1, wherein in said chopper mode said gate control means is operable to provide control signals to one of said gate-controlled turn-off devices to operate that device as a chopper and to the other of said gate-controlled turn-off devices to maintain the same in a blocked state, with the remaining semiconductor devices constituting free-wheeling diodes connected in series between said output terminals of said bridge circuit.

5. A power unit according to claim 1, wherein in said rectifier mode said gate control means is operable to switch said gate-controlled turn-off devices on and off alternately with one another, the remaining semiconductor devices constituting freewheeling diodes connected in series between said output terminals.

6. A power unit for supplying a D-C load from either an A-C or a D-C source, comprising a bridge circuit having two input terminals and two output terminals and four branches each including a unidirectional semiconductor device, the respective semiconductor devices of said branches being connected in such a manner as to permit current flow in only one direction through said output terminals, with at least three of said semiconductor devices being of the gate-controlled turn-off type; switching means connected to said input terminals for switching said terminals selectively between an A-C source and a D-C source; and gate control means for providing control signals to the gates of said gate-controlled turn-off devices in such a manner as to operate said bridge circuit in a chopper mode when said input terminals are connected to a D-C type source by said switching means and in a rectifier mode when said input terminals are connected to an A-C type source by said switching means, when said load is drawing power, and to operate said bridge circuit in a regeneration mode when said load is generating power.

7. A power unit according to claim 6, further comprising a filter including an inductance and a capacitor, said capacitor being connected between said input terminals of said bridge circuit, said inductance being connected between said capacitor and said switching means.

8. In a power system for dual-current railroad locomotives and the like having a D-C motor selectively operable from a A-C or a D-C power source, a power unit for said motor, said power unit comprising a bridge circuit having two output terminals connected to said motor and two input terminals and having four branches each including a unidirectional semiconductor device, the respective semiconductor devices of said branches being connected in such a manner as to permit current flow in only one direction between said output terminals and said motor, with at least three of said semiconductor devices being of the gate-controlled turn-off type; input means including a transformer having a primary winding connected to said source when said source is of the A-C type, switching means for selectively switching said input terminals to a secondary winding of said transformer when said source is of the A-C type and to said source when said source is of the D-C type, and a filter having an inductance and a capacitor with the capacitor being connected between said input terminals and the inductance being connected between said capacitor and said switching means; and gate control means for providing control signals to the gate of said gate-controlled turn-off devices in such a manner as to operate said bridge circuit in a chopper mode when said input terminals are connected to a D-C type source by said switching means and in a rectifier mode when said input terminals are connected to an A-C type source by said switching means, when said motor functions to draw power, and to operate said bridge circuit in a regeneration mode when said motor is functioning to generate power.

* * * * *